United States Patent [19]

Takano

[11] Patent Number: 4,521,904
[45] Date of Patent: Jun. 4, 1985

[54] METHOD OF AND CASSETTE FOR TAKING X-RAY PHOTOGRAPH

[75] Inventor: Masao Takano, Minamiashigara, Japan

[73] Assignee: Fuji Photo Film Co., Ltd., Japan

[21] Appl. No.: 428,437

[22] Filed: Sep. 29, 1982

[30] Foreign Application Priority Data

Oct. 12, 1981 [JP] Japan .............................. 56/162381

[51] Int. Cl.³ .............................................. G03B 41/16
[52] U.S. Cl. ................................... 378/185; 250/484.1
[58] Field of Search .................... 378/185; 250/327.2, 250/484.1, 482.1, 483.1; 252/301.4 H

[56] References Cited

U.S. PATENT DOCUMENTS

| 2,193,021 | 3/1940 | Dietz | 378/185 |
| 2,541,599 | 2/1951 | Morrison | 378/185 |
| 4,261,854 | 4/1981 | Kotera et al. | 250/327.2 |

Primary Examiner—Alfred E. Smith
Assistant Examiner—T. N. Grigsby
Attorney, Agent, or Firm—Gerald J. Ferguson, Jr.; Joseph J. Baker

[57] ABSTRACT

A method of taking an X-ray photograph by using a cassette containing an X-ray film and a stimulable phosphor sheet maintained in close contact with each other in a light shielding case. When the cassette is exposed to X-rays through an object, an X-ray transmission image of the object is recorded on the stimulable phosphor sheet and, at the same time, the X-ray film is exposed to light instantaneously emitted from the stimulable phosphor sheet upon exposure to X-rays to record a photographic latent image of the X-ray transmission image of the object on the X-ray film. The X-ray film may be provided with an emulsion layer only on the side facing the stimulable phosphor sheet, or may be provided with emulsion layers on both sides. In the latter case, an intensifying screen may be positioned on the side of the X-ray film opposite to the stimulable phosphor sheet.

7 Claims, 3 Drawing Figures

METHOD OF AND CASSETTE FOR TAKING X-RAY PHOTOGRAPH

BACKGROUND OF THE INVENTION

1. Field of the Invention

This invention relates to a method of taking an X-ray photograph, and an X-ray photographic cassette for use in the method. More particularly, this invention relates to a method of simultaneously recording an X-ray transmission image (hereinafter referred to as a roentgen image) of an object both on an X-ray photographic film and on a stimulable phosphor sheet, and an X-ray photographic cassette for use in the method.

2. Description of the Prior Art

When certain kinds of phosphors are exposed to such radiation as X-rays, α-rays, β-rays, γ-rays or ultraviolet rays, they store a part of the energy of the radiation. Then, when the phosphor which has been exposed to the radiation is exposed to a stimulating ray such as a visible ray, light is emitted from the phosphor in the pattern of the stored energy of the radiation. A phosphor exhibiting such properties is referred to as a stimulable phosphor.

As disclosed in U.S. Pat. Nos. 4,258,264, 4,276,473, and 4,315,318, it has been proposed to use a stimulable phosphor for recording a radiation image of the human body for medical diagnosis. Specifically, the stimulable phosphor is first exposed to a radiation to have a radiation image stored therein, and is then scanned with a stimulating ray which causes it to emit light in the pattern of the stored image. The light emitted from the stimulable phosphor upon stimulation thereof is photoelectrically detected and converted to an electric image signal, which is processed as desired to reproduce a roentgen image of a quality suitable for viewing and diagnostic purposes.

The radiation image system described above can provide information useful for various diagnoses, which can not be obtained by conventional radiography using a silver halide photographic material, and can greatly improve diagnostic accuracy and efficiency.

However, the roentgen image obtained by the above-described special processing sometimes appears very differently from that recorded on the conventional X-ray film through an intensifying screen. Therefore, it is sometimes difficult for a radiotherapist not so experienced in diagnosis with the specially processed roentgen image to fully utilize the useful information contained in the roentgen image. Accordingly, in the radiation image system using a stimulable phosphor, it is convenient for achieving high diagnostic accuracy and efficiency to create several photographs carrying images obtained from the same original radiation image by image processings of different types or degrees and to make a diagnosis upon comparing these photographs. In this case, if the X-ray photograph taken by the conventional method using a silver halide photographic material is also used for diagnosis together with the several photographs mentioned above, even a radiotherapist experienced only in diagnosis with the conventional X-ray photographs can easily diagnose a case with high accuracy and efficiency.

In order to obtain the conventional X-ray photograph in addition to the photographs taken by the radiation image system using a stimulable phosphor, it is necessary to take the former by the conventional radiography and take the latter by the system using a stimulable phosphor. Thus, at least two photographing operations must be carried out and, as a result, the patient must be exposed at least twice to X-rays, i.e. be given at least a double dose. Further, it is difficult to completely match the conditions of the object in two photographing operations. Therefore, when photographing is conducted twice, deviations occur between the two radiation images obtained due to differences in respiration, position and angle of the object, adversely affecting diagnosis and sometimes necessitating further photographing operations.

Accordingly, it is desired to simultaneously record a radiation image both on a stimulable phosphor and on an ordinary X-ray film. One way for achieving this is to stack a cassette containing a stimulable phosphor sheet and a conventional X-ray film cassette one upon the other, and expose the stack of two cassettes to X-rays through an object to simultaneously record a roentgen image thereon. This method is effective to record a roentgen image on two recording media by one exposure to X-rays. In this method, however, the X-ray film and the stimulable phosphor sheet are considerably spaced apart from each other because the cassette case walls and an intensifying screen of the X-ray film cassette intervene therebetween. As a result, X-ray scattering occurs in the space between the X-ray film and the stimulable phosphor, adversely affecting sharpness and resolution of the roentgen image obtained. Further, the intensity of X-rays drops as the energy thereof is absorbed by the recording medium positioned nearer to the X-ray source, so that the recording medium positioned farther from the X-ray source cannot receive sufficient image information.

SUMMARY OF THE INVENTION

The primary object of the present invention is to provide a method of simultaneously recording a roentgen image both on a stimulable phosphor and on a conventional X-ray film with a substantially equal intensity of X-rays.

Another object of the present invention is to provide a method of simultaneously recording a roentgen image of excellent sharpness and resolution both on a stimulable phosphor and on a conventional X-ray film.

The specific object of the present invention is to provide a cassette for use in the method mentioned above.

The method in accordance with the present invention comprises maintaining an X-ray film and a stimulable phosphor sheet in close contact with each other and shielded from light, and exposing said X-ray film and said stimulable phosphor sheet to X-rays through an object, whereby a roentgen image of said object is recorded on said stimulable phosphor sheet and, at the same time, said X-ray film is exposed to light instantaneously emitted from said stimulable phosphor sheet upon exposure to X-rays to record a photographic latent image of the same roentgen image on said X-ray film.

The cassette in accordance with the present invention comprises an X-ray film and a stimulable phosphor sheet maintained in close contact with each other in a light shielding case. The cassette has a configuration in which at least one of the intensifying screens of the conventional X-ray film cassette is replaced by a stimulable phosphor sheet.

In the present invention, an X-ray film and a stimulable phosphor sheet are contained in a cassette in close contact with each other. Accordingly, a roentgen image of an object can be recorded both on the X-ray film and on the stimulable phosphor sheet by one photographing operation. Furthermore, since there is no substantial distance between the X-ray film and the stimulable phosphor sheet, the roentgen images recorded thereon have the same image size. Because the X-ray film receives light instantaneously emitted from the stimulable phosphor sheet upon exposure to X-rays, the X-ray energy is not lost, and the image information can be recorded on the two recording media with a sufficient intensity. The stimulable phosphor sheet maintained in close contact with the X-ray film acts in the same way as the intensifying screen employed in the conventional radiography. Therefore, in the present invention, it is not necessary to use an intensifying screen. Namely, the X-ray film employed in the present invention need not be sandwiched by intensifying screens as is required conventional radiography, and may be directly stacked on the stimulable phosphor without any intensifying screen intervening therebetween. Accordingly, the present invention can eliminate the necessity of using intensifying screens or can reduce the number of intensifying screens. This is advantageous from economical viewpoint compared with a method in which two cassettes are simply stacked one upon the other and used for simultaneous radiography.

As described above, in the present invention, a roentgen image can be simultaneously recorded both on the stimulable phosphor sheet and on the X-ray film. This is very advantageous in the case of an emergency because, even when one or the other of the electric image readout and processing apparatus (including a computer) necessary for processing the image recorded on the stimulable phosphor sheet and the photographic developing and fixing apparatus necessary for treating the X-ray film breaks down, a final roentgen image for use in diagnosis can still be obtained by using the other processing apparatus.

DESCRIPTION OF THE PREFERRED EMBODIMENTS

The present invention will hereinbelow be described in further detail with reference to the accompanying drawings.

Figure 1:
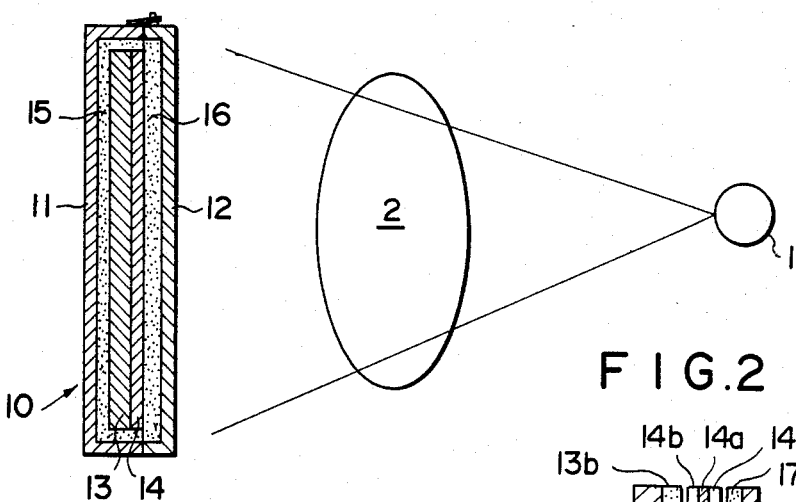
FIG. 1 is a schematic view showing an embodiment of the method of taking an X-ray photograph in accordance with the present invention.

Referring to FIG. 1 showing an embodiment of the method of taking an X-ray photograph in accordance with the present invention, an X-ray cassette 10 is positioned at a point where X-rays emitted from an X-ray source 1 can reach after transmitting through an object 2. The cassette 10 contains a stimulable phosphor sheet 13 and an X-ray film 14 stacked in close contact with each other in a case consisting of a body 11 capable of shielding light and a cover 12 openably mounted on the body 11 by means of a hinge. To assist maintaining the stimulable phosphor sheet 13 and the X-ray film 14 in close contact with each other, soft sponge-like elastic layers 15 and 16 made of urethane foam or the like are attached to the inner surfaces of the case body 11 and the cover 12, respectively. The body 11 and the cover 12 of the case may be made of a metal capable of transmitting X-rays or a hard plastic. The body 11 and the cover 12 may be openably coupled by a latch or the like, instead of a hinge. The elastic layers 15 and 16 may be replaced, for example, by rigid plate materials resiliently supported by leaf springs or the like.

The stimulable phosphor sheet 13 comprises a stimulable phosphor layer provided on a substrate.

In the present invention, the stimulable phosphor may be a stimulable rare earth activated strontium sulfide phosphor or a stimulable rare earth activated lanthanum oxysulfide phosphor as described in U.S. Pat. No. 3,859,527, a stimulable rare earth activated alkaline earth metal fluorohalide phosphor as described in U.S. Pat. Nos. 4,236,078; 4,239,968; and 4,261,854; U.S. patent application Ser. Nos. 57,080 (now abandoned) and 367,665; and Japanese Unexamined patent publication Nos. 56(1981)-2385 and 56(1981)-2386, a stimulable rare earth activated lanthanum oxyhalide phosphor as described in U.S. Pat. No. 4,236,078, a stimulable copper and/or lead activated zinc sulfide phosphor or a stimulable rare earth activated alumina-barium oxide phosphor or a silica-alkaline earth metal oxide phosphor as disclosed in U.S. Pat. No. 4,236,078, or the like. Among the above numerated phosphors, the phosphor exhibiting a high instantaneous light emitting efficiency and a high efficiency of light emission upon stimulation, for example, the stimulable rare earth activated alkaline earth metal fluorohalide phosphor is preferable. When the stimulable phosphor sheet 13 and the X-ray film 14 are stacked in close contact with each other, the phosphor layer side of the stimulable phosphor sheet 13 is brought into close contact with the X-ray film 14 in order to improve the resolution of the roentgen image recorded on the X-ray film 14.

The X-ray film 14 may be a conventional X-ray film provided with emulsion layers on both surface, or may be an X-ray film provided with an emulsion only on the surface facing the stimulable phosphor sheet 13. It is also possible to position an intensifying screen in close contact with the surface of the X-ray film 14 opposite to the side facing the stimulable phosphor sheet 13 in order to intensifying light which the X-ray film 14 is exposed to. An example of such an arrangement is shown in FIG. 2.

Figure 2:
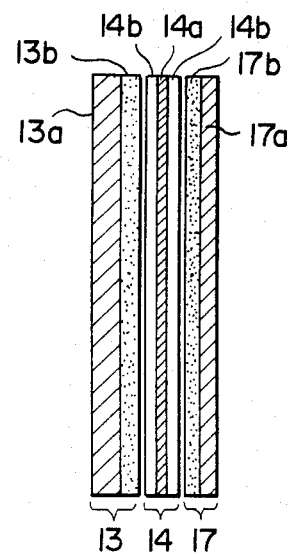
FIG. 2 is a sectional view showing a combination of a stimulable phosphor sheet, an X-ray film and an intensifying screen contained in an X-ray photographic cassette used in the method in accordance with the present invention.

In FIG. 2, the stimulable phosphor sheet 13, the X-ray film 14 and an intensifying screen 17 are housed in a cassette case (not shown). The X-ray film 14 consists of a substrate 14a and silver salt emulsion layers 14b for X-ray films applied on both surfaces of the substrate 14a. The stimulable phosphor sheet 13 consists of a substrate 13a and a stimulable phosphor layer 13b applied on the substrate 13a. The phosphor layer 13b of the stimulable phosphor sheet 13 is closely contacted with one side of the X-ray film 14, and a phosphor layer 17b of the intensifying screen 17 consisting of a substrate 17a and the phosphor layer 17b of the type used for intensifying screens and provided on the substrate 17a is closely contacted with the other side of the X-ray film 14.

When a cassette having the configuration shown in FIG. 2 is exposed to X-rays through an object, a roentgen image of the object is stored in the form of X-ray energy in the stimulable phosphor layer 13b of the stimulable phosphor sheet 13. At the same time, the emulsion layers 14b on both sides of the X-ray film 14 are exposed to light instantaneously emitted from the stimulable phosphor layer 13b upon exposure to X-rays and light emitted from the phosphor layer 17b of the intensifying screen 17. Accordingly, the roentgen image is also recorded on the X-ray film 14 in the form of a photographic latent image.

Figure 3:
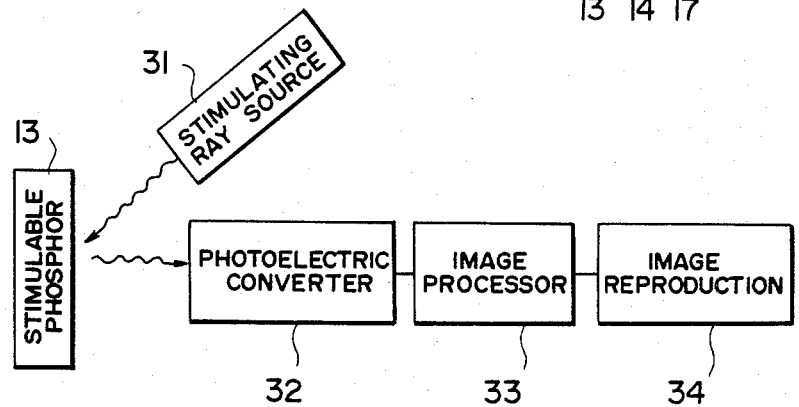
FIG. 3 is a schematic explanatory view showing a method of forming roentgen image by using a stimulable phosphor sheet.

FIG. 3 shows a method of forming a roentgen image by using a stimulable phosphor sheet. The stimulable phosphor sheet 13 carrying the image information stored therein is scanned and stimulated with light emitted from a stimulating ray source 31 such as a laser source for reading out the image information, and emits light upon stimulation. The light emitted from the stimulable phosphor sheet 13 upon stimulation thereof is photoelectrically detected by a photoelectric converter 32, which converts the roentgen image stored in the stimulable phosphor sheet 13 into an electric signal. The electric signal is then processed as desired by an image processing apparatus 33, and reproduced into an image on a display unit or a hard copy by an image reproducing apparatus 34. In this way, a reproduced roentgen image (radiograph) of a quality suitable for viewing and diagnostic purposes is obtained. On the other hand, the X-ray film 14 exposed to X-rays is developed, fixed and washed according to the conventional photographic processing procedure to obtain an X-ray photograph.

The two X-ray photographs obtained as described above show the image of the same object at the same moment. Accordingly, it is possible to correctly and accurately diagnose the case by comparing the two X-ray photographs.

I claim:

1. A method of taking an X-ray photograph, which comprises maintaining an X-ray film and a stimulable phosphor sheet in close contact with each other and shielded from light, and exposing said X-ray film and said stimulable phosphor sheet to X-rays through an object, whereby an X-ray transmission image of said object is recorded on said stimulable phosphor sheet and, at the same time, said X-ray film is exposed to light instantaneously emitted from stimulable phosphor sheet upon exposure to X-rays to record a photographic latent image of the X-ray transmission image of said object on said X-ray film, processing the image recorded on said stimulable phosphor sheet by scanning said latter sheet with a stimulating ray source to cause said latter image to be emitted as a light image; converting said light image to an electrical signal; processing said electrical signal to obtain an image suitable for viewing; and processing the image recorded on the X-ray film by developing and fixing said latter image to obtain a further image suitable for viewing.

2. A method as defined in claim 1 wherein said stimulable phosphor sheet is provided with a layer of a stimulable rare earth activated alkaline earth metal fluorohalide phosphor.

3. A method as defined in claim 1 wherein said X-ray film is provided with a photographic emulsion layer on the side coming into contact with said stimulable phosphor sheet.

4. A method as defined in claim 3 wherein a stimulable phosphor layer of said stimulable phosphor sheet is brought into close contact with said photographic emulsion layer of said X-ray film.

5. A method as defined in claim 1 wherein said X-ray film is provided with photographic emulsion layers on both sides.

6. A method as defined in claim 1 wherein a stimulable phosphor layer of said stimulable phosphor sheet is brought into close contact with one photographic emulsion layer of said X-ray film, and an intensifying screen is positioned on the other photographic emulsion layer.

7. A method as defined in claim 6 wherein an intensifying phosphor layer of said intensifying screen is brought into close contact with said other photographic emulsion layer of said X-ray film.

* * * * *